United States Patent [19]

McGinnis

[11] Patent Number: 5,058,297

[45] Date of Patent: Oct. 22, 1991

[54] PICTURE FRAME ASSEMBLY

[76] Inventor: Michael J. McGinnis, 887 Boyd St., Santa Rosa, Calif. 95407

[21] Appl. No.: 541,834

[22] Filed: Jun. 21, 1990

[51] Int. Cl.$^5$ .......................... G09F 1/12; A47G 1/06
[52] U.S. Cl. ..................................................... 40/155
[58] Field of Search ...................... 40/152, 152.1, 154, 40/155; 403/401–403

[56] References Cited

U.S. PATENT DOCUMENTS

| 4,348,127 | 9/1982 | Hays, Jr. | 40/155 |
| 4,348,826 | 9/1982 | Reim | 40/155 |
| 4,676,686 | 6/1987 | Eisenloffel | 40/155 |

FOREIGN PATENT DOCUMENTS 2647884  4/1978  Fed. Rep. of Germany ........ 40/155

Primary Examiner—Kenneth J. Dorner
Assistant Examiner—J. Hakomaki
Attorney, Agent, or Firm—Richard C. Litman

[57] ABSTRACT

A hand-assembled picture frame has a plurality of triangular, corner connection fittings which interengage mitercut ends of abutting readily available picture frame channel members. Each of two sides of the fitting slidably receives one picture frame channel member and interlocks thereto by projecting locking arms, one arm engaging a cooperating notch in each frame member. The arms, resilient and preferably integral with the balance of the fitting, are accessible from the rear surface of the fitting. A tab within the confines of the fitting is manipulated to release each locking arm. The two intersecting outside walls of the fitting may define an acute angle, slightly less than ninety degrees in order to provide a bending moment to all four channels of an assembled frame, thereby increasing the retention force of a completed frame. A stand-off member in the form of a protuberance may be provided on the rear fitting surface to space the frame assembly from the cooperating supporting surface, such as a wall.

8 Claims, 2 Drawing Sheets

PICTURE FRAME ASSEMBLY

FIELD OF THE INVENTION

This invention relates to readily assembled picture frames and more particularly to a frame assembly allowing hand assembly of picture frames.

BACKGROUND OF THE INVENTION

Kits comprising corner connection fittings for picture frames are well known. They are generally designed for assembly with readily available picture frame channels precut typically at 45 degrees to form square corners when assembled, with two legs of the corner fitting each penetrating one frame channel.

DESCRIPTION OF THE RELATED ART

U.S. Pat. No. 4,023,293 issued to Murray illustrates a corner fitting which relies on a frictional fit with two fittings used in each corner U.S. Pat. Nos. 4,136,470 and 4,862,612 issued respectively to Barz and to Sugihara et al. disclose corner fittings with manually operated detent means. Sugihara et al. ('612) further provide spring biasing of the assembled corner to improve the interlock action. However, this patent relies on picture frame channels having precisely located and manufactured apertures to cooperate effectively with the locking/detent means. Further, these apertures must be relatively narrow due to their orientation with respect to the frame channels; this makes it difficult to insert fingers into the aperture to operate the release means.

SUMMARY OF THE INVENTION

It is therefore an object of this invention to provide a corner connection fitting to permit rapid manual assembly and disassembly of picture frames which overcomes the aforementioned objections.

It is also an object of this invention to provide a corner connection fitting having an integral bottom surface adapted to contact an underlying supporting surface along a sufficient distance to preclude contract of the assembled frame with the supporting surface.

It is a further object of this invention to provide improved rigidity of assembled corners of hand-assembled picture frames.

Yet another object of the invention is to provide an improved picture frame assembly including enhanced access to release means for disassembly by hand without using tools.

An additional object of the invention is to simplify a corner connection fitting and still provide enhanced interlock between the fitting and the frame channels which does not impair structural strength or rigidity of the channels or the fitting.

Yet another object of the invention is to provide a corner connection fitting which will increase the interlocking effect and which will reinforce the abutment of the miter cut members of the picture frame when an attempt is made to pull one frame channel from the corner connection fitting without releasing a detent.

Still another object of the invention is to provide a corner connection fitting which may be used with readily available picture frame channels not having premanufactured apertures to cooperate with locking/detent means, requiring only a single readily available cutting or abrading tool for field fabrication of the required aperture.

With these and other objects in view Which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 1 is a bottom plan view of a corner connection fitting;

Similar reference characters designate corresponding parts throughout the several figures of the drawings.

DESCRIPTION OF THE PREFERRED EMBODIMENTS

Figure 3:
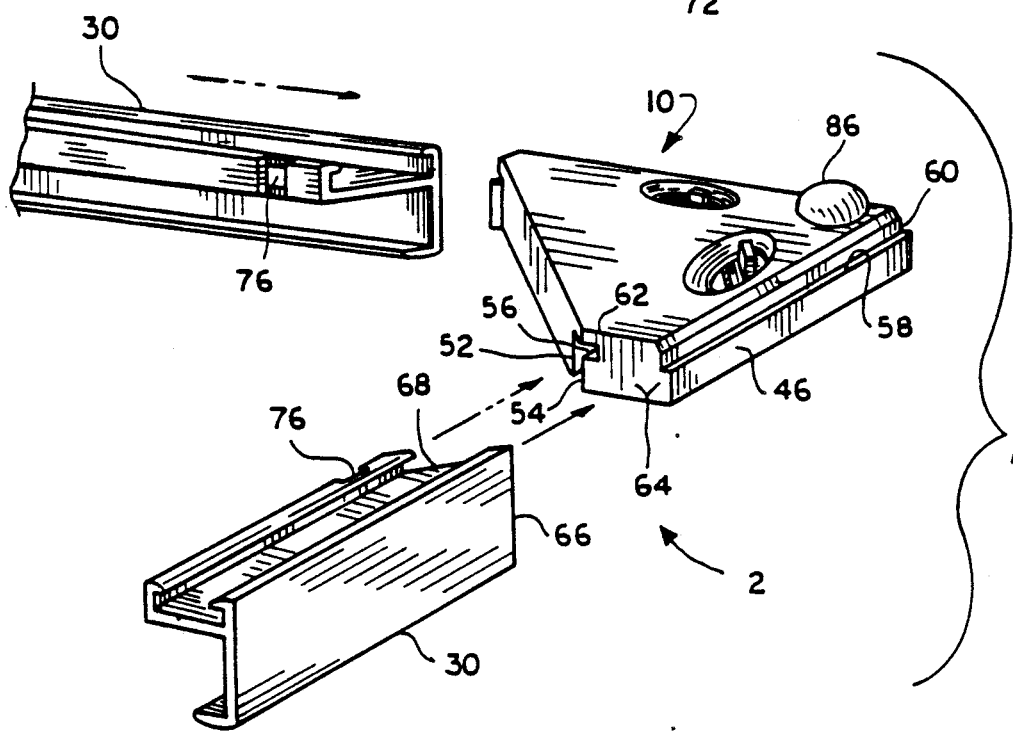
FIG. 3 is an exploded perspective view of a corner connection fitting and two picture frame channels.

Turning now to the drawings, particularly FIG. 3, the present invention will be seen to comprise a demountable frame assembly 2 comprising a plurality of corner fittings 10 adapted to releasably interfit with a plurality of intermediate frame rails or channels 30.

Each picture frame channel 30 includes an outer planar wall 32 terminating in a topmost inwardly directed flange or lip 34 which cooperates with a larger, parallel shelf 36 to define a picture groove 38 adapted to receive and retain artwork (not shown) As is well known, such artwork may comprise one or more layers of material including, but not limited to, canvas, mat board, etc.

Figure 5:
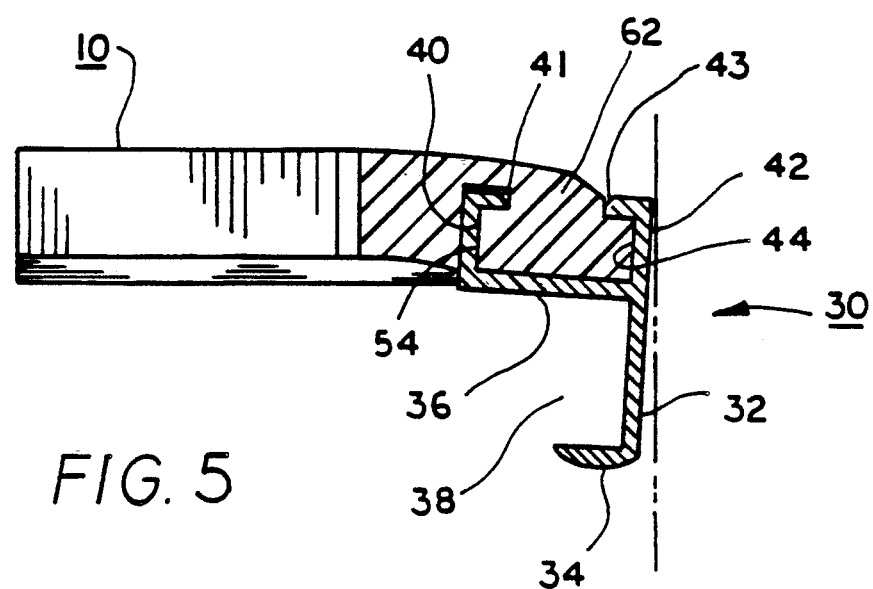
FIG. 5 is a vertical sectional view of the assembly of FIG. 4, taken along line A—A.

As shown most clearly in FIG. 5, each channel 30 is provided with an inner wall 40 inwardly spaced from an outer wall extension 42 to form a fitting-receiving passageway 44 therebetween. The walls 40,42 include opposed flanges 41,43 respectively, the purpose of Which will become apparent hereinafter.

FIG. 1 shows the rear of the corner connection fitting 10 that comprises a unitary member of substantially triangular configuration having two outside walls 46,48 intersecting ar ninety degrees to form a corner edge 50. As depicted most clearly in FIG. 3, spaced inwardly from each outside wall 46,48 is a vertical groove 52 forming an inside wall 54 communicating with a horizontal groove 56. This latter groove 56 is a mirror image of the area as defined by a horizontal ledge 58 and vertical shoulder 60 immediately adjacent the outside wall 46. The mass of the corner fitting areas between the two pairs of opposed walls may be referred to as the fitting tongues 62 and will be seen to define, in cross-section, a generally T-shaped configuration.

Optionally, this joint may be further urged into tight abutment by a bending moment provided by an inclination of the fitting tongue 62; as illustrated in FIG. 5.

The above-described construction allows for the ready attachment of a pair of frame channels 30,30 to a single corner fitting 10 by respectively sliding each channel 30 toward the end face 64 of each tongue 62 with the channel flanges 41,43 engaging the horizontal groove 56 while the inner wall 40 enters the vertical groove 52. Each channel 30 forms a close sliding fit as it cooperates with the corner fitting 10 and is slipped inwardly until its corner edge 66 is juxtaposed the corner edge 50 of the fitting. Since both channels 30,30 as joined by an one fitting 10 will be provided with a 45 degree mitered end 68, it follows that a flush joint will be formed.

Figure 4:
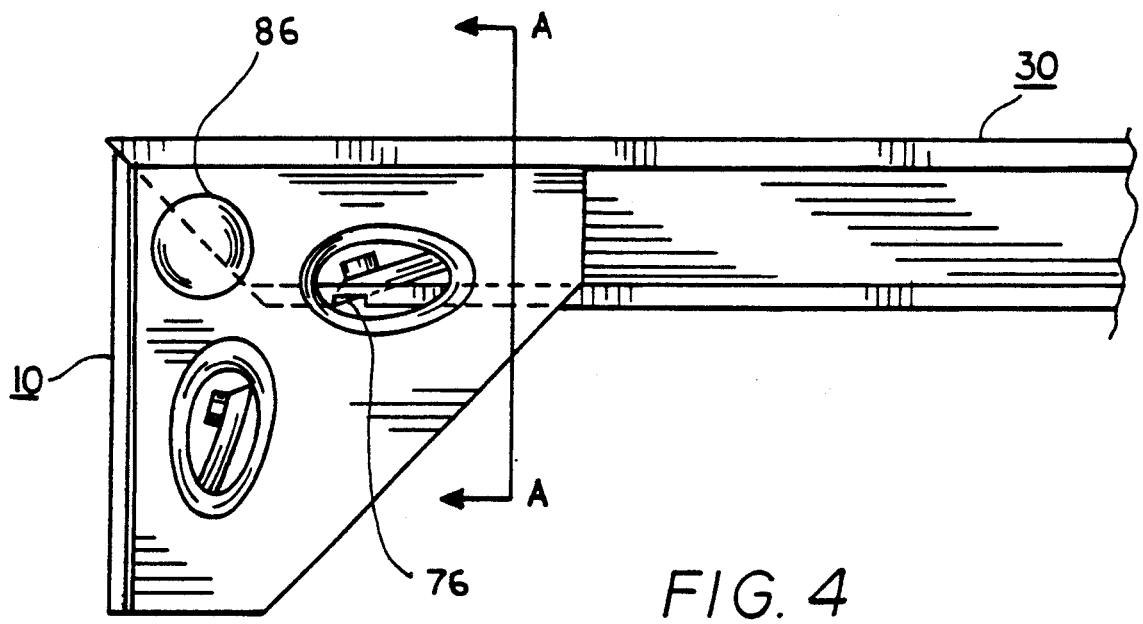
FIG. 4 is a bottom plan view of a corner connection fitting with one frame in its fully assembled position.

To positively retain the assembled channels in the above use position, releasable locking means 70 are provided in each corner fitting 10, in the form of a locking detent arm 72. This detent is preferably formed as an integral part of the molded fitting and is readily accomplished particularly when the fittings are constructed of plastics. Thus, the arm 72 will be understood to be resilient and includes a free bevel cut end 74 disposed in a horizontal plane coplanar with the tongue inside wall 54 and thus, the channel inner wall 40. The normal, at-rest position of the resilient detent arm end 74 will be understood to be within the area of the fitting vertical groove 52. In this manner, it will follow that as each channel 30 is inserted into the assembled position with a fitting 10, the channel inner wall 40 will engage and deflect the lock arm 72 outwardly, toward the fitting outer wall portion 42. The lock arm remains thusly displaced until the channel is fully inserted as shown in FIG. 4, at which point a cut-out or notch 76 formed in the channel inner wall 40 is positioned opposite the lock arm end 74 and allows the resilience of the arm to project the arm end into the cut-out to secure the assembly.

In order to permit selective disassembly of a frame as above assembled, each lock arm 72 is provided with a finger tab 78 integral therewith and which extends through an aperture 80 formed in the fitting rear surface 82. Quite obviously, to preclude interference with the wall or other environmental structure disposed behind the frame assembly 2, the distal portion 79 of each tab 78 extends short of the plane of the fitting rear surface 82. Additionally, to facilitate the operation of the tab 78 when releasing the locking arm 72 for disassembly of the respective channels 30, the apertures 80 are preferably bounded by a bevel or chamfer 84.

Figure 7:
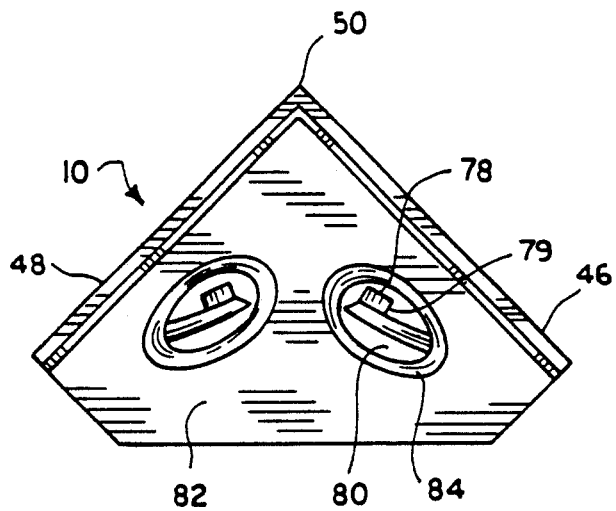
Figure 2:
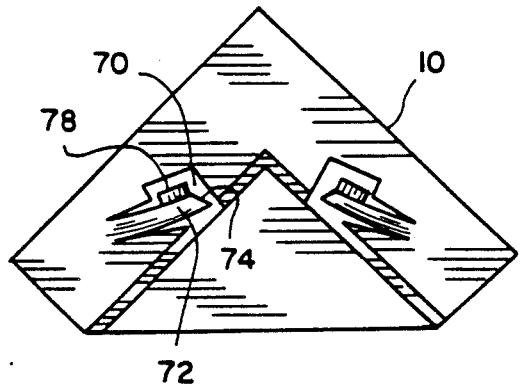
FIG. 2 is a top plan view of the corner connection fitting of FIG. 1.

As previously described, the outer walls 46,48 of the fittings 10 are disposed normal to one another. As an alternative, the actual angle defined by these two walls may be slightly less than 90 degrees such as, greater than 85 degrees and less than 90 degrees. With such a construction, it will follow that when assembling a rectangular frame assembly 2 utilizing four such modified corner fittings 10, a slight bending moment will be applied to the assembled channels. This force will be substantially equally divided among the plurality of channels and provide a slight lateral pressure between the portions of each channel grasping the respective fitting tongues thereby enhancing the retention of all components when interfitted. When plastics are utilized for the channels, quite obviously the channels will permit a greater bending and accordingly, the fitting outer wall angle may be more acute than the normal disposition as shown in FIGS. 1 and 2.

The rear surface 82 of fitting 10 will be seen to form a plane generally in the form of a right triangle, defined by a hypotenuse extending between the respective end faces 64 of each tongue 62 and two additional sides formed by outside walls 46 and 48, which sides meet and form a right angle at corner edge 50. Rear surface 82 will thus be seen to extend beyond the space provided within the joint formed within each frame channel 30, thus providing a relatively larger gusset for each joint than that offered by other such devices.

The triangular expanse of the fitting rear surface 82 will be understood not only to provide maximum rigidity to each corner fitting 10 but also offers the ultimate in stability when mounting a picture or the like in the assembly, such as when the frame is flushly affixed to a wall. In this respect, an option exists when a user desires to otherwise mount the assembly for example, with a picture wire (not shown) or other means. Accordingly, any number of the corner fittings 10 may include spacer means such as the rounded protuberance 86 projecting from the rear surface 82 adjacent the fitting corner edge 50.

It is to be understood that the present invention is not limited to the sole embodiments described above, but encompasses any and all embodiments within the scope of the following claims.

I claim:

1. A picture frame assembly comprising:
    a plurality of corner fittings and interfitted frame channels,
    each said fitting having a rear surface and including a pair of tongue areas,
    each said tongue area bounded by an outside wall and an inner vertical groove,
    said outside walls conjoined at a corner edge,
    said fitting rear surface forming a substantially triangular plane defined by said outside walls and said corner edge,
    a horizontal groove extending from each said vertical groove and a horizontal ledge extending from each said outside wall,
    resilient lock means disposed within said tongue area and normally projecting into a respective one said vertical groove,
    said frame channels each including opposed vertical outer and inner walls each terminating in opposing flanges,
    said channel opposing flanges disposed in a plane vertically offset from said plane of said fitting rear surface,
    a pair of said channels attachable to respective ones of said fitting tongue areas attachable to respective ones of said fitting tongue areas by insertion of each said channel inner wall within said fitting vertical groove as said channel outer wall slidably engages said fitting outside wall with said channel flanges respectively engaging said fitting horizontal groove and ledge, and
    catch means on each said channel engageable with said lock means and retaining each said channel interfitted with said corner fitting when said channel outer wall fully overlies said fitting outside wall.

2. A picture frame assembly according to claim 1 wherein,
    said lock means includes an arm integral with said fitting.

3. A picture frame assembly according to claim 1 wherein,
    said fitting outside walls are normal to one another.

4. A picture frame assembly according to claim 1 wherein,
    said catch means includes an opening within said channel inner wall.

5. A picture frame assembly according to claim 1 including, a protuberance on said fitting area surface disposed adjacent the intersection of said outside walls.

6. A picture frame assembly according to claim 1 wherein, said fitting rear surface includes an aperture, and a tab on said lock means is disposed within said aperture for manipulation of said lock means.

7. A picture frame assembly according to claim 6 wherein, said tab includes a distal portion disposed in a plane not projecting beyond the plane of said fitting rear surface.

8. A picture frame assembly according to claim 1 wherein, the outside wall and inner vertical groove of the tongue areas define an angle other than ninety degrees with respect to the plane of the rear surface of said corner fittings.

* * * * *